J. F. LINEHAN.
SCREW CUTTING DIE.
APPLICATION FILED JULY 12, 1913.

1,088,431.

Patented Feb. 24, 1914.

Witnesses:
William L Saunders
Perley C Fink

Inventor,
John F. Linehan,
by Samuel W Balch
Attorney.

UNITED STATES PATENT OFFICE.

JOHN F. LINEHAN, OF YONKERS, NEW YORK, ASSIGNOR TO D. SAUNDERS' SONS, OF YONKERS, NEW YORK, A CORPORATION OF NEW YORK.

SCREW-CUTTING DIE.

1,088,431.

Specification of Letters Patent. Patented Feb. 24, 1914.

Application filed July 12, 1913. Serial No. 778,782.

*To all whom it may concern:*

Be it known that I, JOHN F. LINEHAN, a citizen of the United States of America, and a resident of Yonkers, county of Westchester, and State of New York, have invented certain new and useful Improvements in Screw-Cutting Dies, of which the following is a specification.

This invention relates to means for automatically releasing screw-cutting dies which are constructed with screw-cutting jaws or chasers which may be separated to release the work and more particularly to a type of die which is on the market for the threading and reaming of the ends of pipe.

The object of the invention is to provide a releasing device which can be applied to dies of this general or specific type without interference with any of the existing features.

A further object is to provide a construction wherein the pressure of the end of the pipe against the reamer operates the release.

Figure 1:
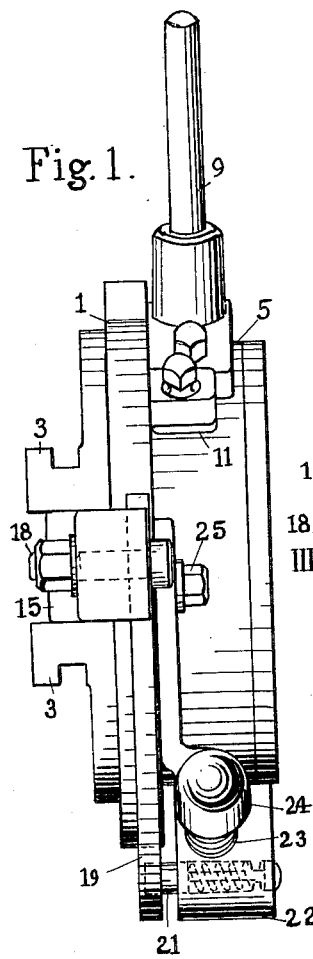
Figure 2:
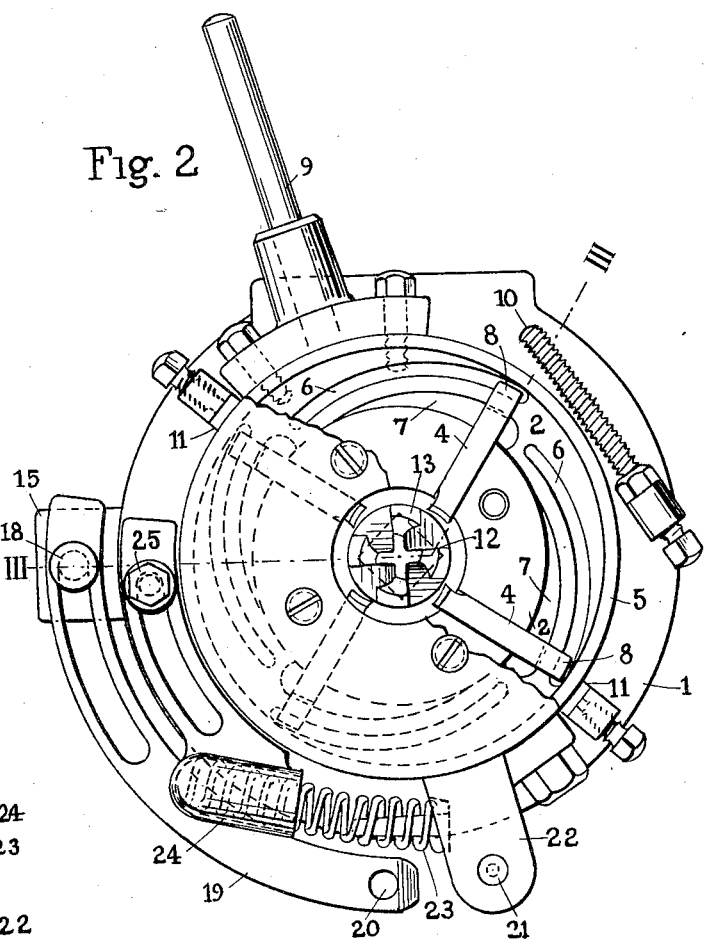
Figure 3:
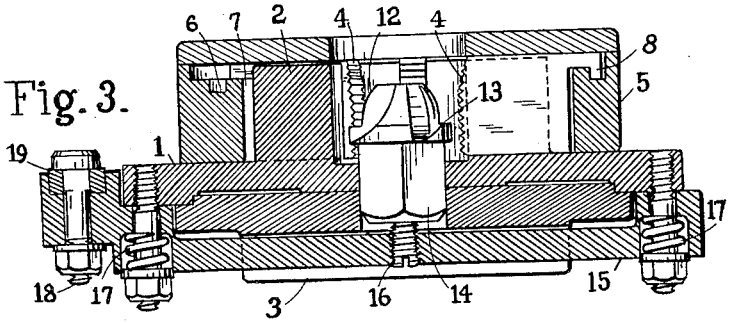

In the accompanying sheet of drawings which forms a part of this application Figure 1 is a side elevation of a die embodying my invention. Fig. 2 is a front elevation of the die with the cover broken away. Fig. 3 is a section through the die on the line III—III of Fig. 2.

The die comprises a supporting plate 1 with a radially slotted hub 2 on one side and transverse ways 3 3 on the other side. The plate is in two parts for convenience of construction, one part carrying the hub and the other part carrying the ways. The slots in the hub carry screw-cutting jaws or chasers 4 4. Surrounding the hub is a shell 5 which carries eccentric cam grooves 6 6 and contiguous recesses 7 7 the walls of which are parallel to the cam grooves. The jaws or chasers abut against the walls of the recesses and have hooks 8 8 at their rear ends which engage the cam grooves. A handle 9 attached to the shell serves to impart a circular movement which through the cams advances the screw-cutting jaws. A stop screw 10 carried by the supporting plate limits the movement. This screw is set back as the jaws wear so that they can be closed the necessary amount to keep the thread the same size. Friction blocks 11 11 serve to hold the die in any desired adjustment when the automatic devices hereinafter described are not used.

In the center of the die is a reamer 12 which serves to cut out any burs and ream the inside of the end of the pipe at the same time that it is threaded. The reamer has a shoulder 13 and a square shank 14 which passes through a square hole in the supporting plate to keep it from turning, but the shoulder does not bear against the plate, instead it is supported from a block 15 which is let into a slot planed out between the ways. A screw 16 at the middle of this block supports the reamer. The block in turn is supported in the slot by springs 17 17. To one end of this block is clamped by a screw 18 one end of a curved strip 19 which carries at its other end a hole 20. This hole is engaged by a spring protruded latch pin 21 the pin being carried by a block 22 which is bolted to the shell. The latch pin and the curved strip form the two latch members and the curved strip is of such length as will permit the location of the latch on the side of the die where it will be out of the way of the friction blocks and admit of the necessary adjustments. A spring 23 abuts against the block attached to the shell and an adjustable abutment 24 which is held to the supporting plate by a screw 25 supports the other end of the spring.

In operation the die is supported on a transverse slide of a pipe cutting machine. The die is closed by pulling over the handle to a point where the jaws will be closed sufficiently to cut the required diameter of thread, and to preserve the size when determined the stop screw is set up and the slotted latch member adjusted so that the latch will engage as the socket of the handle strikes the stop. As the pipe is drawn into the die and the threading nears completion, the end of the pipe strikes the shoulder of the reamer and this through the connecting parts depresses one of the latch members and releases the shell which is then thrown around by the spring to open the jaws.

What I claim as new, and desire to secure by Letters Patent of the United States, is—

1. The combination of a supporting plate, screw-cutting jaws carried thereby, a circularly moving shell for closing the jaws, a latch for the shell when in position for closing the jaws, a shouldered reamer with connections to the latch whereby the latch is released when the reamer is depressed, and means for returning the shell whereby the jaws are retracted when the latch is released, substantially as described.

2. The combination of a plate with transverse ways by which it is supported, screw-cutting jaws carried by the plates, a circularly moving shell for closing the jaws, a latch for the shell when in position for closing the jaws, comprising an engaged and an engaging member, a spring supported block guided between the transverse ways and carrying one of the latch members, a shouldered reamer connected with the block whereby the block is depressed and the latch released, and means for returning the shell whereby the jaws are retracted when the latch is released, substantially as described.

Signed at Yonkers, N. Y., this 10th day of July, 1913.

JOHN F. LINEHAN.

Witnesses:
WILLIAM B. FINK,
PERLEY C. FINK.